United States Patent Office 3,649,644
Patented Mar. 14, 1972

3,649,644
**1,2,3,4,4a,5,6,6a-OCTAHYDROBENZOFURO
[3,2-c]INDOLES**
Arch Christian Sonntag, Gainesville, Fla., and Sylvester Klutchko, Hackettstown, and John Shavel, Jr., Mendham, N.J., assignors to Warner-Lambert Company, Morris Plains, N.J.
No Drawing. Filed Aug. 8, 1969, Ser. No. 848,745
Int. Cl. C07d 27/04
U.S. Cl. 260—326.5 B                 11 Claims

ABSTRACT OF THE DISCLOSURE

The present invention discloses a tetracyclic hydrogenated benzofuro[3,2-c]indole having the formula:

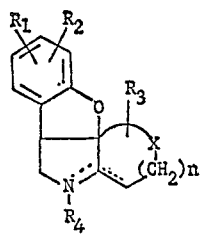

wherein $n$ is from 2 to 4, inclusive; X is sulfur, oxygen, $CH_2$, or $N$—$R_5$, wherein $R_5$ is hydrogen, alkyl, aryl or aralkyl; $R_1$ is hydrogen, hydroxy, acyloxy, alkoxy, alkyl or halogen; $R_2$ is hydrogen, hydroxy, acyloxy, alkoxy, alkyl or halogen; $R_1$ and $R_2$ taken together are methylenedioxy; $R_3$ is alkyl, aryl or aralkyl; and $R_4$ is hydrogen, lower alkyl, substituted alkyl or aralkyl, acyl, alkenyl, guanyl, $CH_3 \oplus I\ominus$ or $(CH_3)_2 \oplus I\ominus$ (when no double bond is present) and which may or may not contain a double bond between the positions indicated.

These compounds are useful as central nervous system stimulants.

---

The present invention relates to certain novel tetracyclic compounds; and more particularly, the present invention relates to novel tetracyclic hydrobenzofuro[3,2-c] indoles of the formula:

(I)

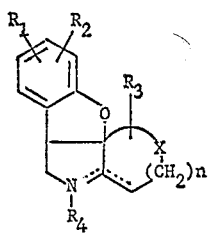

wherein $n$ is from 2 to 4, inclusive; X is sulfur, oxygen, $CH_2$, or $N$—$R_5$, in which $R_5$ is hydrogen, lower alkyl, aryl, or aralkyl; $R_1$ or $R_2$ are hydrogen, hydroxy, acyloxy, lower alkoxy, lower alkyl or halogen; or $R_1$ and $R_2$ taken together form a lower alkylenedioxy; $R_3$ is lower alkyl, aryl or aralkyl; and $R_4$ is hydrogen, lower alkyl, substituted alkyl or aralkyl, acyl, lower alkenyl, guanyl, $CH_3 \oplus I\ominus$ or $(CH_3)_2 \oplus I\ominus$ when no double bond is present.

In the above structural formula, the dotted line indicates the presence or absence of a double bond between the positions indicated.

As used in this disclosure, the term "halogen" comprehends all four halogens, namely, chlorine, bromine, fluorine and iodine. The term "lower alkyl" as used herein, includes hydrocarbons having 1 to 7 carbon atoms in the carbon chain. It includes straight chain as well as branched chain radicals. The term includes, for example, methyl, ethyl, propyl, isopropyl and the like. The term "substituted lower alkyl" includes lower alkyl as defined above wherein one or more of the hydrogen atoms has been substituted by groups such as hydroxy, halogen and the like. The term "lower alkenyl" connotes unsaturated lower alkyl hydrocarbons from 2 to 7 carbon atoms in the carbon chain. The term "aryl" as used throughout this disclosure denotes a monocyclic hydrocarbon radical, preferably of 6 to 10 carbon atoms, such as for example, phenyl, tolyl, and the like. The term "aralkyl" encompasses lower alkyl groups in which an aryl group as defined above is substituted for a hydrogen atom such as for example, benzyl, phenethyl and the like. The term "lower alkoxy" includes from 1 to 7 carbon atoms in the carbon chain, for example, methoxy, ethoxy, propoxy, isopropoxy and the like. The term "lower alkylenedioxy" includes such terms as methylenedioxy, ethylenedioxy and the like. The term "acyl" are those groups of hydrocarbon carboxylic acids of less than 12 carbon atoms as exemplified by the lower alkanoic acid, for example, acetic, propionic, butyric, the lower alkenoic acids, the monocyclic aryl carboxylic acids, for example, benzoic and toluic, the monocyclic aryl lower alkanoic acids, for example, phenylacetic and β-phenylpropionic acid, the cycloalkane carboxylic acids and the cycloalkene carboxylic acids.

The symbols $R_1$, $R_2$, $R_3$, $R_4$ and $R_5$ as used hereinafter have the same meaning as defined above.

The present invention also includes within its scope the non-toxic, therapeutically acceptable acid addition salts of the above compounds and various medicinal dosage forms containing the subject compounds or their acid addition salts as active ingredients.

The numbering of the compounds of this invention is as follows:

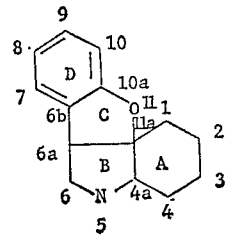

The compounds of this invention exhibit a stimulant action on the central nervous system of various mammalian hosts, such as mice, cats, dogs, monkeys and the like. They are indicated in the treatment of mild to moderate depressive states. Such states include, for example, fatigue, sadness and the like. Generally speaking, a dose range of about 0.5 to 25 mg./kg. body weight 1 to 3 times daily is recommended to treat such depressive states. This dosage regimen can, of course, be varied according to the age, weight, sex, species and the severity of the condition being treated, but is within the above indicated dosage range.

In order to use these compounds, they are combined with pharmaceutical excipients, such as lactose, starch, mannitol, dicalcium phosphate, spray-dried lactose, water for injection and the like and compounded into dosage forms such as tablets, capsules and injections by methods well known to the pharmacists' art.

According to the present invention, the above compounds are produced in several steps. Typically, the first step involves the preparation of $R_1,R_2$-substituted 2-hydroxy nitrostyrenes (II), such as 2-hydroxy-3-methoxy-nitrostyrene having the following structural formula:

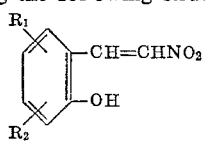

(II)

wherein $R_1$ and $R_2$ are as previously defined. The preparation of this compound is disclosed in C. B. Gairaud, G. R. Lappin, J. Org. Chem., 18, 1 (1953).

The above nitrostyrenes are reacted with cycloalkanone eneamines; as for example, the morpholine-cyclohexanone eneamine (Ref. Gilbert Stork, et al., J. Am. Chem. Soc., 85, 207 (1963)), having the formula:

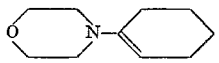

(III)

in an anhydrous neutral solvent, preferably dioxane, at a temperature range, preferably from 50–110°, for 1 to 6 hours to give novel tricyclic intermediates IV, such as 5-methoxy - 1,2,3,4,4a,9a - hexahydro - 4a-morpholino-9-(nitromethyl)-xanthenes, having the formula:

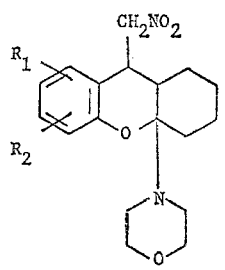

(IV)

By varying the eneamine and nitrostyrene employed, but employing analogous reaction conditions as described, other tetracyclic intermediates V are readily obtained.

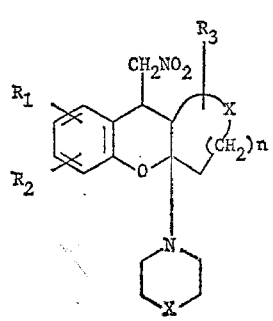

(V)

The next step involves the preparation of the novel intermediate nitrones (VI), as exemplified by 3,3a,4,5,6,7-hexahydro - 3 - (2-hydroxy - 3 - methoxyphenyl)-2H-indole 1-oxide, having the formula:

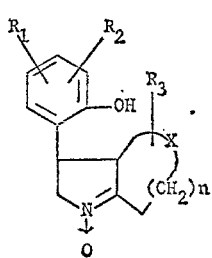

(VI)

This preparation is effected by a catalytic reduction in an acid media or a zinc-ammonium chloride reduction of V. The next step is a cyclization step which is carried out by treating VI at an elevated temperature, preferably boiling xylene to give those tetracyclic compounds of this invention having the following structural formula:

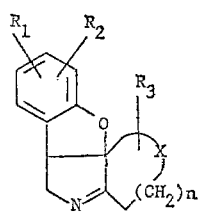

(VII)

Compound VII can be further treated, as exemplified below to give other compounds of this invention:

(1) Reduction of VII, for example, catalytic hydrogenation in an acid medium, preferably an ethanol-acetic medium results in the production of Compound VIII:

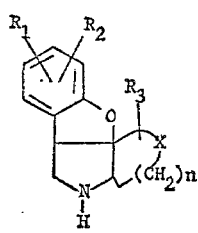

(VIII)

(2) Treatment of VII with acetic anhydride at a temperature range of about 50 to 100° C. produces Compound IX having the formula:

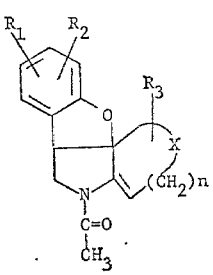

(IX)

(3) Compound VII can also be treated with a peracetic acid generated in situ at elevated temperature, such as from 50 to 90° C., to yield compounds having the formula:

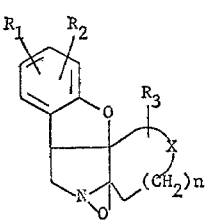

(X)

(4) Compound VII can also be treated with methyl halide to yield the corresponding quaternary compounds of the formula:

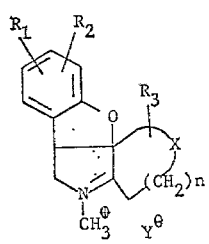

(XI)

in which Y is a halide ion.

(5) Compound XI can also undergo further reactions for example, treatment with hydrogen using a platinum catalyst yields compounds of the formula:

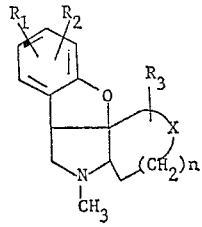

(XII)

Transformations of VIII are best illustrated in the following flow sheet.

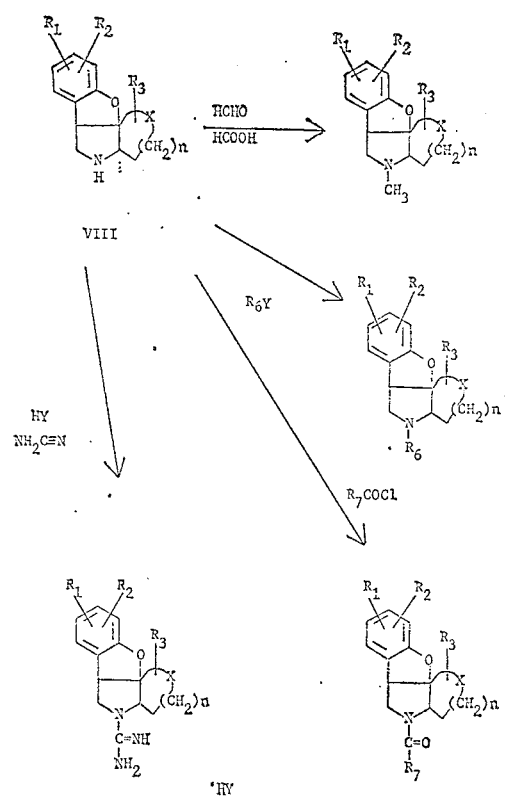

wherein $n$, X, Y, $R_1$, $R_2$ and $R_3$ have the previous meaning; $R_6$ is lower alkyl, aralkyl, or substituted alkyl, such as β-morpholinoethyl or β-hexamethyleneiminoethyl, substituted aralkyl or alkenyl; and $R_7$ is alkyl or aralkyl.

The compounds of our invention may be converted into their pharmaceutically acceptable non-toxic acid addition salts by conventional procedures. Exemplary of non-toxic acid addition salts are those formed with acetic, maleic, fumaric, succinic, tartaric, citric, malic, cinnamic, sulfonic, hydrochloric, hydrobromic, sulfuric, phosphoric, and nitric acids. The acid addition salts may be prepared in the conventional manner by treating a solution or suspension of the free base in an organic solvent with the desired acid, and then recovering the salts which form by crystallization techniques.

The following examples are included to further illustrate the invention.

EXAMPLE 1

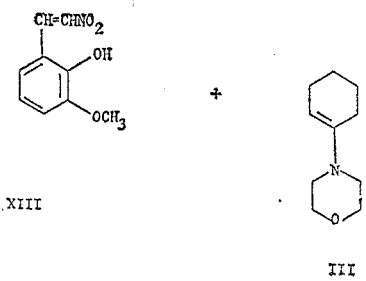

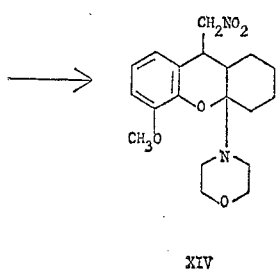

5-methoxy-4a-morpholino-9-nitromethyl-1,2,3,4,9,9a-hexahydro-4aH-xanthene

A solution of 145 g. (0.743 mole) of 2-hydroxy-3-methoxy-nitrostyrene, 800 ml. of dioxane and 69.6 g. (0.8 mole) of cyclohexanone-morpholine eneamine is heated on the steam bath for 2 hours. About 500 ml. of dioxane is removed on the rotary vacuum evaporator and 200 ml. of 2-propanol is added to the thick residue. The separated orange crystals are filtered and washed with 2-propanol (most of the intensely dark color washes through) and then petroleum ether to give 85 g. (31.5%) of XIV melting at 198–200° C. A total of 40–50% of XIV is isolated by adding water to the filtrate and recrystallizing the crudes which are obtained. Analytically pure material is obtained by recrystallization from tetrahydrofuran-petroleum ether, M.P. 199–201° C.

*Analysis.*—Calcd. for $C_{19}H_{26}N_2O_5$ (percent): C, 62.96; H, 7.23; N, 7.73. Found (percent): C, 63.15; H, 7.28; N, 7.48.

EXAMPLE 2

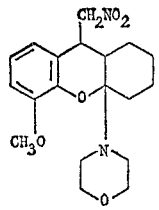

XIV

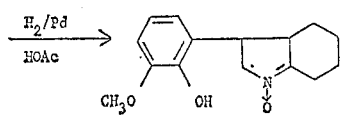

XV

3,3a,4,5,6,7-hexahydro-3-(2-hydroxy-3-methoxyphenyl)-2H-indole 1-oxide

A solution of 271.5 g. (0.75 mole) of XIV, 750 ml. of glacial acetic acid and 3 liters of methanol is hydrogenated 16 hours at low pressure using 15 g. of 10% Pd/C catalyst. The catalyst is filtered and the filtrate is concentrated on rotary vacuum evaporator to remove most of the methanol and acetic acid. Water (750 ml.) is added and solid potassium carbonate is added to neutralize and then to saturate the solution. The aqueous phase is decanted from the insoluble taffy-like material. This material is dissolved in 1.5 liters of methylene chloride. The solution is dried over potassium carbonate, filtered and is concentrated. Ether (300 ml.) is added to the residue. The insoluble pinkish solid is filtered and washed with ether to give 130 g. (66.3%) of solid melting at 110–115° C. Recrystallization is effected by dissolving in a minimum volume of hot methylene chloride, concentrating to about ½ volume and adding equal volume of ethyl acetate. Pure material melts at 120–122° C.

*Analysis.*—Calcd. for $C_{15}H_{19}NO_3 \cdot HCL$ (percent): C, 60.50; H, 6.77; N, 4.70; Cl, 11.91. Found (percent): C, 60.38; H, 6.71; N, 4.62; Cl, 11.77.

EXAMPLE 3

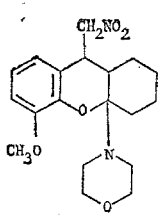

XIV

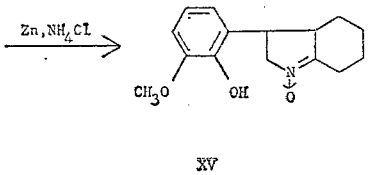

XV

Alternative preparation of 3,3a,4,5,6,7-hexahydro-3-(2-hydroxy-3-methoxyphenyl)-2H-indole 1-oxide A solution of 0.54 g. (0.01 mole) of ammonium chloride in 15 ml. of water is added to a solution of 3.6 g. (0.01 mole) of XIV in 75 ml. of tetrahydrofuran. With vigorous stirring at room temperature, zinc powder (7 g.) is added over a 2 minute period. The mixture is stirred for 45 minutes. The zinc is filtered and washed with 10 ml. of T.H.F. The filtrate is treated with 50 ml. of 1 N hydrochloric acid and after 15 minutes this solution is neutralized with solid potassium carbonate excess. The aqueous phase is separated and the T.H.F. solution is dried further with solid potassium carbonate, filtered and is concentrated. Ether (50 ml.) is added to the residue and the solid which arose on seeding is filtered and washed with ether, wt. 2.2 g., M.P. 105–110° (84.6% yield). This material is recrystallized by dissolving in warm methylene chloride (20 ml.) and adding 20 ml. of ethyl acetate. The tan crystals weigh 1.1 g., M.P. 118–121° C.

EXAMPLE 4

1,2,3,4,4a,5,6,6a-octahydro-5-[2-(hexamethyleneimino)ethyl]benzofuro[3,2-c]indol-10-ol A solution of 3.3 g. (0.007) of 1,2,3,4,4a,5,6,6a-octahydro-1-[2 - (hexamethyleneimino)ethyl] - 10-methoxybenzofuro[3,2-c]indole dihydrochloride hydrate in 50 ml. of conc. HBr is maintained at reflux for 2 hours. The pink solution is diluted to 300 ml. volume with ice water and basified with conc. ammonium hydroxide. The initial very tacky pink materials are filtered off and solid $K_2CO_3$ is added to nearly saturate the filtrate. The separated amorphous pink-tan solid is extracted into 200 ml. of methylene chloride. The solution is dried ($K_2CO_3$), filtered, stripped of solvent and is redissolved in 50 ml. of hot "Skellysolve B." "Super Cel" is added to the turbid solution and upon cooling crystals slowly separate, wt. 1.0 g. (39.2% yield), M.P. 130–132° C. Recrystallization from "Skelly B" gives pure tan material melting at 130–132° C.

*Analysis.*—Calcd. for $C_{22}H_{32}N_2O_2$ (percent): C, 74.12; H, 9.05; N, 7.86. Found (percent): C, 74.37; H, 9.23; N, 7.75.

EXAMPLE 5

1,2,3,4,4a,5,6,6a, - octahydro-5-[2-(hexamethyleneimino)ethyl]-10-methoxybenzofuro[3,2-c]indole dihydrochloride hydrate A mixture of 18.0 g. (0.064 mole) of 1,2,3,4,4a,5,6,6a-octahydro-10-methoxybenzofuro[3,2-c]indole hydrochloride, 14.8 g. (0.075 mole) of hexamethyleneiminoethyl chloride hydrochloride, 300 ml. of N,N-dimethylformamide and 30.6 g. (0.3 mole) of triethylamine is heated with stirring at 110–115° C. for one hour. After cooling and filtration of most of the separated triethylamine hydrochloride, the reaction solution is concentrated on a rotary vacuum evaporator to remove most of the DMF. The residue is triturated with 800 ml. of ether. The turbid ether solution is decanted from much insoluble tar-like material, charcoaled and filtered. The dihydrochloride is prepared by treating the solution with a definite excess of hydrogen chloride. The ether is decanted and the tacky salt is dissolved in 200 ml. of 2-propanol. Upon addition of 400 ml. of ether the separated oily salt slowly crystallizes. The still not fully crystalline salt is filtered and redissolved in 150 ml. of methanol. Upon addition of 150 ml. of ether, 10.5 g. (35.6%) of near white crystals are obtained, M.P. 242–245° C. Recrystallization from methanol ether gives pure white material melting at 243–246° C.

*Analysis.*—Calcd. for $C_{23}H_{34}N_2O_2 \cdot 2HCl \cdot H_2O$ (percent): C, 59.86; H, 8.30; N, 6.07. Found (percent): C, 59.72; H, 8.46; N, 5.99.

EXAMPLE 6

1,2,3,4,4a,5,6,6a,-octahydro-10-methoxy-5,5-dimethylbenzofuro[3,2-c]indolinium iodide A solution of ca. 0.009 mole of 1,2,3,4,4a,5,6,6a-octahydro - 10 - methoxy-5-methylbenzofuro[3,2-c]indole base (prepared from 3.6 g. of the hydroiodide salt) in 300 ml. of ether is treated with 4.2 g. (0.03 mole) of methyl iodide. The white crystals which slowly separate over two days weigh 3.4 g. (94.5% yield) and melt at 258–260° C. Recrystallization from ethanol ether gives pure white crystals melting at 258–260° C.

*Analysis.*—Calcd. for $C_{16}H_{21}NO_2 \cdot CH_3I$ (percent): C, 50.88; H, 6.03; N, 3.49. Found (percent): C, 51.17; H, 6.08; N, 3.79.

EXAMPLE 7

1,2,3,4,4a,5,6,6a,-octahydro-5-methylbenzofuro[3,2-c] indol-10-ol

A solution of 8.0 g. (0.02 mole) of 1,2,3,4,4a,5,6,6a,-octahydro - 10-methoxy-5-methylbenzofuro[3,2-c]indole hydroiodide in 80 ml. of 48% hydrobromic acid is heated to 115–120° for 5 minutes. The cooled solution is diluted to 500 ml. volume with ice water. Solid potassium carbonate is added very gradually to neutralize and then to saturate. The product is extracted into 500 ml. methylene chloride. The organic phase is dried ($K_2CO_3$), filtered and is then concentrated to near dryness. Ether (100 ml.) is added and the separated white soild is washed with a little ether and dried wt. 3.5 g. (69.3%) M.P. 218–220°. Recrystallization from ethylacetate-petroleum ether gives pure crystals melting at 218–220° C.

*Analysis.*—Calcd. for $C_{15}H_{19}NO_2$ (percent): C, 73.44; H, 7.81; N, 5.71. Found (percent): C, 73.64; H, 7.87; N, 5.75.

EXAMPLE 8

1,2,3,4,4a,5,6,6a,-octahydro-10-methoxy-5-(2-morpholinoethyl)benzofuro[3,2 - c]indole dihydrochloride monohydrate A stirred mixture of 6.0 g. (0.021 mole) of 1,2,3,4,4a,5,6,6a - octahydro-10-methoxybenzofuro[3,2-c]indole hydrochloride, 4.65 g. (0.025 mole) of morpholinoethylchloride hydrochloride, 100 ml. of DMF and 10.2 g. (0.1 mole) of triethylamine is heated to 100°. With nearly complete solution taking place at 100°, the mixture is held at 100–110° for 2 hours, cooled, filtered of triethylamine hydrochloride and is then concentrated to remove all of the DMF solvent. The residue is triturated with 200 ml. of ether (much dark tacky material remains out of solution). The turbid ether solution is decanted, charcoaled, filtered and treated with excess hydrogen chloride gas (excess to form dihydrochloride) until complete precipitation of the tacky salt. The ether is decanted and the residue is dissolved in ca. 150 ml. of 2-propanol. Crystallization begins to take place before complete solution. Ether (100 ml.) is added and the solid is filtered and washed with ether and weighs 7.0 g. (74.3%) M.P. 253–256° C. The compound is recrystallized from methanol-ether to give 4.4 g. (46.7%) melting at 268–270° C. This material is identified as pure dihydrochloride monohydrate.

*Analysis.*—Calcd. for $C_{21}H_{30}N_2O_3 \cdot 2HCl \cdot H_2O$ (percent): C, 56.13; H, 7.63; N, 6.23; Cl, 15.78. Found (percent): C, 56.27; H, 7.65; N, 6.55; Cl, 15.90.

EXAMPLE 9

5-allyl-1,2,3,4,4a,5,6,6a-octahydrobenzofuro[3,2-c] indol-10-ol

Powdered sodium bicarbonate (20 g.) is added to a solution of 6.6 g. (0.0285 mole) of 1,2,3,4,4a,5,6,6a-octahydrobenzofuro [3,2-c]indol-10-ol in 50 ml. of N,N-dimethylformamide. The mixture is heated with stirring to 65° when 3.6 g. (0.03 mole) of allyl bromide is added. The temperature rises quickly to 75°. After stirring at 75° for 15 minutes, ice water (500 ml.) is added and the separated brown solid is filtered, washed well with water and dried to give 4.6 g. (59.6% yield) of crude product melting at 168–170° C. Recrystallization is effected by dissolving in 50 ml. of hot ethylacetate, adding 100 ml. petroleum ether to the brown solution and quickly filtering off the brown fluocculance before crystals separate. The light tan crystals which separate in the filtrate are pure, weigh 3.1 g. and melt at 179–181°. Further recrystallization from Skellysolve B did not raise melting point.

*Analysis.*—Calcd. for $C_{17}H_{21}NO_2$ (percent): C, 75.25; H, 7.80; N, 5.16. Found (percent): C. 75.14; H, 7.80; N, 5.29.

EXAMPLE 10

5-allyl-1,2,3,4,4a,5,6,6a-octahydro-10-methoxybenzofuro[3,2-c]indole

A quantity of 5.80 g. (0.048 mole) of allyl bromide is added to a solution of 9.8 g. (0.04 mole) of 1,2,3,4,4a, 5,6,6a-octahydro-10-methoxybenzofuro[3,2-c]indole base in 30 ml. of N,N-dimethylformamide. The solution becomes warm (T=50°). After about 5 minutes, 8 g. of triethylamine is added and immediately the hydrobromide of it separates. After 15 minutes 300 ml. of ice water is added and the separated oil gradually crystallizes. After filtration and water wash the damp crude is dissolved in 400 ml. of ether; the ether solution is dried ($K_2CO_3$), charcoaled, filtered and is then concentrated to give 10.1 g. of very tacky product. Petroleum ether (200 ml.) is added and the mixture is heated to the boiling point, cooled and filtered to give 4.6 g. of product melting at 82–85°. The filtrate is concentrated to ½ volume to give another 2.5 g. melting at 81–83° C. for a total weight of 7.1 g. (62.3% yield). Recrystallization from Skellysolve B gives pure white crystals melting at 83–85° C.

*Analysis.*—Calcd. for $C_{18}H_{23}NO_2$ (percent): C, 75.75; H, 8.12; N, 4.91. Found (percent): C, 75.87; H, 8.13; N, 5.15.

EXAMPLE 11

1,2,3,4,4a,5,6,6a-octahydro-10-methoxy-5-phenethyl benzofuro[3,2-c]indole hydrochloride Initially 5.52 g. (0.03 mole) of β-phenethylbromide and then 8.0 g. triethylamine is added to a solution of 7.0 g. (0.029 mole) of 1,2,3,4,4a,5,6,6a-octahydro-10-methoxybenzofuro[3,2-c]indole base in 30 ml. of DMF. The reaction solution is heated at 95–100° for eight minutes at which time a TLC showed starting material with at least two other spots present. The heating is discontinued and after accidentally spilling some of the reaction mixture, water 500 ml. is added and the separated oil is extracted into 500 ml. of ether. The ether solution is washed with two portions of 500 ml. of water, dried over anhydrous potassium carbonate, filtered and treated with hydrogen chloride gas to precipitate a tacky salt. The ether is decanted and the residue is dissolved in ca. 100 ml. of hot 2-propanol. Ether (800 ml.) is added to "knock out" an oily salt which gradually crystallizes. The filtered and dried salt weighs 4.0 g. and melts at 190–195° C. Recrystallization from ethanol-ether gives pure crystals with a broad melting range of 198–208° C.

*Analysis.*—Calcd. for $C_{23}H_{27}NO_2 \cdot HCl$ (percent): C, 71.58; H, 7.31; N, 3.63. Found (percent): C, 71.58; H, 7.41; N, 3.78.

EXAMPLE 12

1,2,3,4,4a,5,6,6a-octahydro-10-methoxybenzofuro[3,2-c] indole-5-carboxamidine hydrochloride A quantity of 2.52 g. (0.06 mole) of cyanamide is added to a solution of 8.4 g. (0.03 mole) of 1,2,3,4,4a,5,6,6a-octahydro - 10 - methoxybenzofuro[3,2-c]indole hydrochloride in 75 ml. of N,N-dimethylformamide. After heating to 140° for 15 minutes the solution is cooled and ether (600 ml.) is added to "knock out" a tacky salt which soon solidifies. The filtered and ether washed solid weighs 8.0 g. and melts at 260–265°. This material is shown to be a mixture of starting material and product. Recrystallization by dissolving in 50 ml. of hot methanol and addition of 50 ml. of ether gives 2.0 g. of product melting at 313–315° C. The 4.5 g. of recovered mixture (by adding ether to filtrate) is effectively purified by recrystallization from 20 ml. of hot water to give 1.2 g. of crystals melting at 313–315°. The total weight of good product is 3.2 g. (33% yield). Recrystallization of the 3.2 g. from methanol ether gives 3.1 g. of pure product melting at 313–315° C.

*Analysis.*—Calcd. for $C_{16}H_{21}N_3O_2 \cdot HCl$ (percent): C, 59.35; H, 6.85; N, 12.98; Cl, 10.95. Found (percent): C, 59.46; H, 6.97; N, 13.12; Cl, 10.99.

EXAMPLE 13

1,2,3,4,4a,5,6,6a-octahydro-4a,5-epoxy-10-methoxy-benzofuro[3,2-c]indole

A volume of 100 ml. of 30% hydrogen peroxide is added to a solution of 48.6 g. (0.2 mole) of 1,2,3,4,6,6a-hexahydro - 10 - methoxybenzofuro[3,2-c]indole base. The reaction solution is heated to 80–90° for 15 minutes and allowed to cool for 15 minutes (T=ca. 50°). Crystals separate. After 10 minutes 400 ml. of water is added to give more solid from the resulting turbid mixture. The filtered and washed (water) solid is dried to give 25.0 g. (48.4%) of solid melting at 151–153° C. Recrystallization from 2-propanol gives pure white crystals melting at 157–159° C.

*Analysis.*—Calcd. for $C_{15}H_{17}NO_3$ (percent): C, 69.48; H, 6.61; N, 5.40. Found (percent): C, 69.61; H, 6.58; N, 5.26.

EXAMPLE 14

1,2,3,4,6,6a-hexahydro-10-hydroxy-5-methylbenzofuro[3,2-c]indolinium iodide

Methyl iodide (25 ml.) is added to a solution of 4.5 g. (0.0197 mole) of 1,2,3,4,6,6a - hexahydro - benzofuro-[3,2-c]indol - 10 - ol in 25 ml. of dimethylformamide. After TLC indication that the starting material is gone (ca. 1½ hrs.), ether (200 ml.) is added to "knock out" an oil. The supernatant is decanted and the oil is dissolved in 50 ml. of warm 2-propanol. The separated crystals are filtered and washed with a little 2-propanol and dried to give 5.3 g. (72.6%) melting at 200–202° C. Recrystallization from absolute ethanol gives pure material melting at 200–202° C.

*Analysis.*—Calcd. for $C_{14}H_{15}NO_2 \cdot ICH_3$ (percent): C, 48.53; H, 4.89; N, 3.77. Found (percent): C, 48.59; H, 4.86; N, 3.52.

EXAMPLE 15

1,2,3,4,6,6a-hexahydrobenzofuro[3,2-c]indol-10-ol

A solution of 111.9 g. (0.4 mole) of 1,2,3,4,6,6a-hexahydro - 10 - methoxybenzofuro[3,2-c]indole hydrochloride in 700 ml. of 48% hydrobromic acid is heated at reflux for twenty minutes. After cooling, 1.5 liter of ice water is added and concentrated ammonium hydroxide is added until pH 8.5. The pinkish tan solid is filtered, washed well with water and dried, wt. 82.0 g. (89.7%) M.P. 203–205° C. Recrystallization is effected by dissolving in boiling 2-propanol and adding petroleum ether. The pure material is white and melts at 203–205° C.

*Analysis.*—Calcd. for $C_{14}H_{15}NO_2$ (percent): C, 73.34; H, 6.59; N, 6.11. Found (percent): C, 73.46; H, 6.72; N, 6.34.

EXAMPLE 16

1,2,3,4,4a,5,6,6a-octahydrobenzofuro-[3,2-c]indol-10-ol

A volume of 150 ml. of absolute ethanol is added to a solution of 46.0 g. (0.3 mole) of 1,2,3,4,6,6a-hexahydrobenzofuro[3,2-c]indol-10-ol in 100 ml. of glacial acetic acid. This solution is hydrogenated at low pressure using 1.0 g. $PtO_2$ and 1.0 g. Pd/C catalyst. When hydrogen uptake stops (theory), the catalyst is filtered and 1 liter of ice water is added to the filtrate. Concentrated $NH_4OH$ is added until complete precipitation of tan solid. After filtration, washing with water and drying, the product weights 40.0 g. (86.6%) and melts at 220–225° C. Recrystallization from absolute ethanol gives pure pinkish solid melting at 235–237° C.

*Analysis.*—Calcd. for $C_{14}H_{17}NO_2$ (percent): C, 72.70; H, 7.41; N, 6.06. Found (percent): C, 72.62; H, 7.42; N, 6.04.

EXAMPLE 17

5-acetyl-1,2,3,5,6,6a-hexahydro-10-methoxy-benzofuro[3,2-c]indole

A quantity of 5.8 g. (0.0239 mole) of 1,2,3,4,6,6a-hexahydro-10-methoxybenzofuro[3,2-c]indole base is dissolved in 30 ml. of acetic anhydride. After 5 minutes reflux, 200 ml. of water is added. The mixture is stirred for ½ hour and the solid is filtered and washed well with water and dried; wt. 6.1 g. (89.8%) M.P. 168–170° C. The crude is recrystallized from 100 ml. of absolute ethanol to give 5.1 g. of pure peach colored crystals melting at 176–178°.

*Analysis.*—Calcd. for $C_{17}H_{19}NO_3$ (percent): C, 71.56; H, 6.71; N, 4.91. Found (percent): C, 71.51; H, 6.85; N, 5.12.

EXAMPLE 18

1,2,3,4,4a,5,6,6a-octahydro-10-methoxy-5-methyl-benzofuro[3,2-c]indole hydroiodide A solution of 6.5 g. (0.0169 mole) of 1,2,3,4,6,6a-hexahydro - 10-methoxybenzofuro[3,2-c]indole methiodide in 250 ml. of absolute ethanol is hydrogenated in a Paar apparatus for 16 hours using 150 mg. $PtO_2$ and 200 mg. 10% Pd/C as a catalyst. After filtration of catalyst and concentrated to ca. 50 ml. volume, 200 ml. of ether is added. The separated product weighs 6.1 g. (93.2%) and melts at 207–209° C. The hydroiodide is recrystallized from ethanol ether to give pure pale yellow crystals melting at 208–210° C.

*Analysis.*—Calcd. for $C_{16}H_{21}NO_2 \cdot HI$ (percent): C, 49.62; H, 5.73; N, 3.62. Found (percent): C, 49.86; H, 5.85; N, 3.47.

EXAMPLE 19

1,2,3,4,6,6a-hexahydro-10-methoxybenzofuro-[3,2-c]indole methiodide

A solution of 4.0 g. (0.0165 mole) of 1,2,3,4,6,6a-hexahydro - 10 - methoxybenzofuro[3,2-c]indole base in 25 ml. of methyl iodide is maintained at reflux for one hour (after ca. 10 minutes solid separates). Most of the methyl iodide is distilled off and 50 ml. of ether is added. The yellow solid is filtered and washed with ether to give 6.0 g. (94.6% yield) of quaternary melting at 198–200° C. Recrystallization from ethanol-ether gives pure material melting at 200–202° C.

*Analysis.*—Calcd. for $C_{15}H_{17}NO_2 \cdot ICH_3$ (percent): C, 49.88; H, 5.23; N, 3.64. Found (percent): C, 50.09; H, 5.30; N, 3.77.

EXAMPLE 20

1,2,3,4,4a,5,6,6a-octahydro-10-methoxybenzofuro-[3,2-c]indole hydrochloride

A mixture of 5.5 g. (0.027 mole) of 1,2,3,4,6,6a-hexahydro-10-methoxybenzofuro[3,2-c]indole base, 250 ml. of absolute ethanol, 20 ml. of glacial acetic acid and 200 mg. of $PtO_2$ catalyst is hydrogenated in a Paar apparatus for 6 hours. After filtration and concentration to remove most of the alcohol, 300 ml. of water and then 10 M potassium hydroxide is added to pH 10. The separated viscous oil is extracted into 600 ml. ether. The solution is dried over potassium carbonate and filtered. Hydrogen chloride is bubbled-in to precipitate the salt weighing 6.0 g. (94.2%) and melting at 268–270° C. Recrystallization from 2-propanol-ether affords pure white material melting at 277–279° C.

*Analysis.*—Calcd. for $C_{15}H_{19}NO_2 \cdot HCl$ (percent): C, 63.94; H, 7.15; Cl, 12.58. Found (percent): C, 64.10; H, 7.24; Cl, 12.35.

EXAMPLE 21

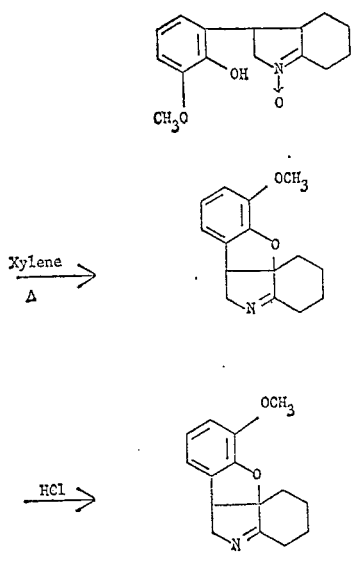

1,2,3,4,6,6a-hexahydro-10-methoxybenzofuro-[3,2-c]indole hydrochloride

A mixture of 60.0 g. (0.23 mole) of I and 400 ml. of xylene is heated with stirring to near the boiling point in a round bottom flask set up for distillation. All solid dissolves and water and xylene slowly distill over. In a period of ½ hour, the theory of water (4.2 ml.) and ca. 50 ml. of xylene are obtained. The reaction flask is cooled (red solution) and ca. 300 ml. of ether is added. This solution is washed with 200 ml. of 2 M KOH and is dried over anhydrous potassium carbonate. After filtration the solution is treated with HCl gas until complete precipitation of the tacky salt. The filtered salt weighs ca. 48 g. Recrystallization is from 200 ml. of hot absolute ethanol. On cooling the separated crystals are filtered and washed with ethanol (most of the dark red color washed through) and then with ether to give 35 g. of pink solid melting at 224–226° C. A second crop of 5.9 g. is obtained on adding ether to filtrate, M.P. 223–225° C.; yield, 62.2%.

*Analysis.*—Calcd. for $C_{15}H_{17}NO_2 \cdot HCl$ (percent): C, 64.40; H, 6.48; N, 5.01. Found (percent): C, 64.31; H, 6.70; N, 5.17.

EXAMPLE 22

1,2,3,4,6,6a-hexahydro-8-methoxybenzofuro[3,2-c]indole hydrochloride

This compound is prepared by the same method as the 10-methoxy isomer. The pure hydrochloride melts at 183–185° C.

*Analysis.*—Calcd. for $C_{15}H_{17}NO_2 \cdot HCl$ (percent): C, 64.40; H, 6.48; N, 5.01. Found (percent): C, 64.64; H, 6.55; N, 5.03.

EXAMPLE 23

1,2,3,4,4a,5,6,6a-octahydro-8-methoxybenzofuro[3,2-c]indole hydrochloride

This compound is prepared by the same method as the 10-methoxy isomer. The pure hydrochloride salt melts at 238–240° C.

*Analysis.*—Calcd. for $C_{15}H_{19}NO_2 \cdot HCl$ (percent): C, 63.94; H, 7.15; N, 4.97. Found (percent): C, 63.72; H, 7.22; N, 5.02.

EXAMPLE 24

1,2,3,4,4a,5,6,6a-octahydrobenzofuro[3,2-c]indole-8-ol hydrochloride

This compound is prepared by the same method as the 10-ol isomer. The pure hydrochloride melts at 297–299° C.

*Analysis.*—Calcd. for $C_{14}H_{17}NO_2$ (percent): C, 62.80; H, 6.78; N, 5.23. Found (percent): C, 62.76; H, 6.92; N, 5.46.

EXAMPLE 25

3,3a,4,5,6,7-hexahydro-3-(2-hydroxy-5-methoxyphenyl)-2H-indole 1-oxide

This compound is prepared by the same method as the 2-hydroxy-3-methoxyphenyl isomer. The pure material melts at 174–176° C.

*Analysis.*—Calcd. for $C_{15}H_{19}NO_3$ (percent): C, 68.94; H, 7.33; N, 5.36. Found (percent): C, 69.19; H, 7.44; N, 5.24.

We claim:
1. A compound of the formula

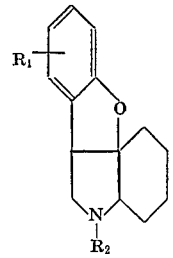

wherein $R_1$ is hydroxy or lower alkoxy, and $R_2$ is hydrogen, lower alkyl, phenyl lower alkyl, lower alkenyl, or $(CH_3)_2$ $\oplus I \ominus$ and its non-toxic pharmaceutically acceptable acid addition salts thereof.

2. A compound of claim 1 which is 1,2,3,4,4a,5,6,6a-octahydro-10-methoxy-5,5 - dimethylbenzofuro[3,2 - c]indolinium iodide.

3. A compound of claim 1 which is 1,2,3,4,4a,5,6,6a-octahydro-5-methylbenzofuro[3,2-c]indol-10-ol.

4. A compound of claim 1 which is 5-allyl-1,2,3,4,4a,5,6,6a-octahydrobenzofuro[3,2-c] indol-10-ol.

5. A compound of claim 1 which is 5-allyl-1,2,3,4,4a,5,6,6a-octahydro-10-methoxybenzofuro[3,2-c]indole.

6. A compound of claim 1 which is 1,2,3,4,4a,5,6,6a-octahydro-10-methoxy-5-phenethyl-benzofuro[3,2-c]indole.

7. A compound of claim 1 which is 1,2,3,4,4a,5,6,6a-octahydrobenzofuro[3,2-c]indol-10-ol.

8. A compound of claim 1 which is 1,2,3,4,4a,5,6,6a-octahydro-10-methoxy-5-methyl-benzofuro[3,2-c]indole.

9. A compound of claim 1 which is 1,2,3,4,4a,5,6,6a-octahydro-10-methoxybenzofuro[3,2-c]indole.

10. A compound of claim 1 which is 1,2,3,4,4a,5,6,6a-octahydro-8-methoxybenzofuro[3,2-c]indole.

11. A compound of claim 1 which is 1,2,3,4,4a,5,6,6a-octahydrobenzofuro[3,2-c]indole-8-ol.

References Cited

Schroeder et al.: Chemical Abstracts, vol. 57, pp. 792–93 (1962).

ALEX MAZEL, Primary Examiner

J. TOVAR, Assistant Examiner

U.S. Cl. X.R.

260—247.5 R, 247.7 G, 326.16; 424—274